United States Patent
Haase et al.

(10) Patent No.: US 7,643,626 B2
(45) Date of Patent: Jan. 5, 2010

(54) METHOD FOR DEPLOYING, PROVISIONING AND STORING INITIAL FILTER CRITERIA

(75) Inventors: Oliver Haase, Fair Haven, NJ (US); Kazutaka Murakami, Freehold, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 988 days.

(21) Appl. No.: 11/022,915

(22) Filed: Dec. 27, 2004

(65) Prior Publication Data

US 2006/0140385 A1 Jun. 29, 2006

(51) Int. Cl.
*H04M 3/42* (2006.01)
(52) U.S. Cl. ............................ 379/201.03; 379/201.12; 370/395.3
(58) Field of Classification Search ............ 379/201.03; 370/395; 455/414
See application file for complete search history.

(56) References Cited

U.S. PATENT DOCUMENTS

| | | | |
|---|---|---|---|
| 6,243,457 B1 | 6/2001 | Lin et al. | |
| 6,351,646 B1 | 2/2002 | Jellema et al. | |
| 6,522,876 B1 | 2/2003 | Weiland et al. | |
| 6,622,016 B1 * | 9/2003 | Sladek et al. | 455/414.1 |
| 2005/0108347 A1 * | 5/2005 | Lybeck et al. | 709/207 |
| 2005/0190772 A1 * | 9/2005 | Tsai et al. | 370/395.52 |
| 2005/0213606 A1 * | 9/2005 | Huang et al. | 370/467 |

FOREIGN PATENT DOCUMENTS

| | | |
|---|---|---|
| EP | 05 25 7617 | 3/2006 |
| WO | WO 01/20856 A | 3/2001 |
| WO | WO 2004/086800 A2 | 10/2004 |

OTHER PUBLICATIONS

"Digital cellular telecommunications system (Phase 2+); Universal Mobile Telecommunications System (UMTS); IP Multimedia (IM) session handling; IM call model; Stage 2 (3GPP TS 23.218 version 6.2.0 Release 6); ETSI TS 123 218" ETSI Standards, European Telecommunications Standards Institute, Sophia-Antipo, FR, vol. 3-CN1, No. V620, Sep. 2004, pp. 1-58, XP014027526, ISSN: 0000-0001.

"Digital cellular telecommunications system (Phase 2+); Universal Mobile Telecommunications System (UMTS); ip Multimedia Subsystem (IMS); Stage 2 (3GPP TS 23.228 version 5.12.0 Release 5); ETSI 123 228" ETSI Standards, European Telecommunications Standards Institute, Sophia-Antipo, FR, vol. 3-SA2, No. V5120, Mar. 2004, pp. 1-131, XP014016500 ISSN: 0000-0001.

* cited by examiner

*Primary Examiner*—Creighton Smith
(74) *Attorney, Agent, or Firm*—Wall & Tong, LLP

(57) ABSTRACT

The inventors provide herein methods for the decomposition of initial Filter Criteria (iFCs) into user-independent, global data and user specific data. In various embodiments of the present invention, the approach is based on Trigger point templates that represent families of trigger points, which are able to be instantiated to real trigger points by adding missing user specific data. Trigger point templates are specified at service deployment time and are instantiated to real trigger points and complemented with the other iFC components to form complete iFCs at the time of service subscription. It is demonstrated that the trigger point methods of the present invention facilitate the storing, provisioning and downloading of initial filter criteria and are beneficial in terms of at least storage and run-time efficiency.

29 Claims, 12 Drawing Sheets

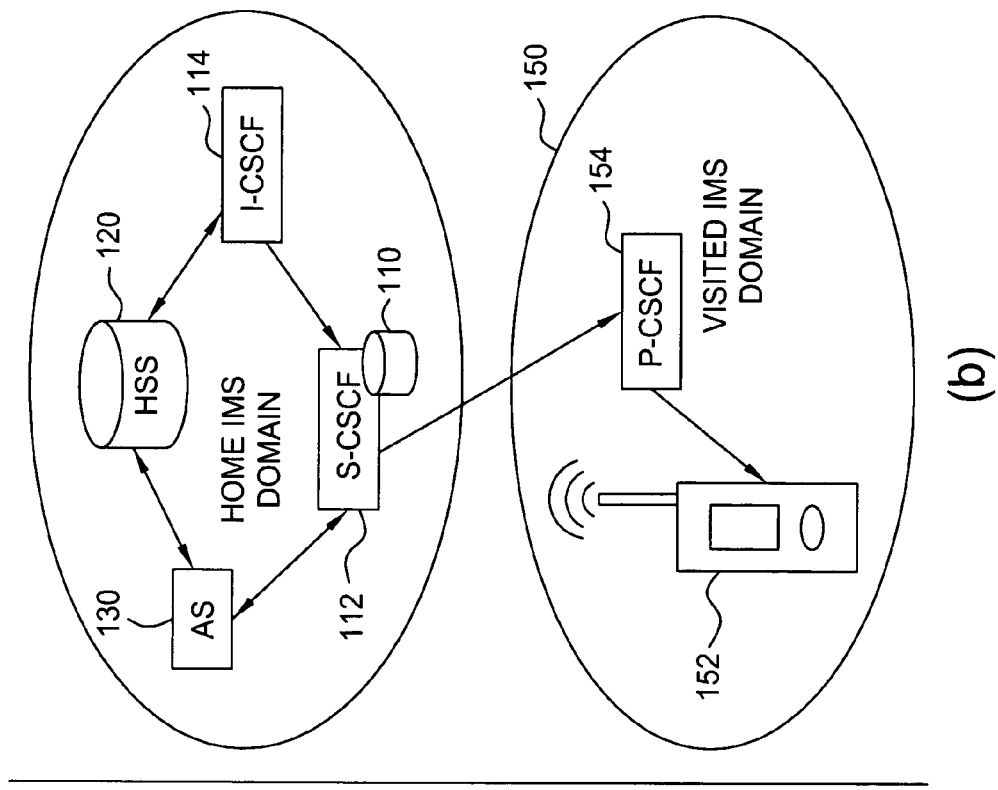
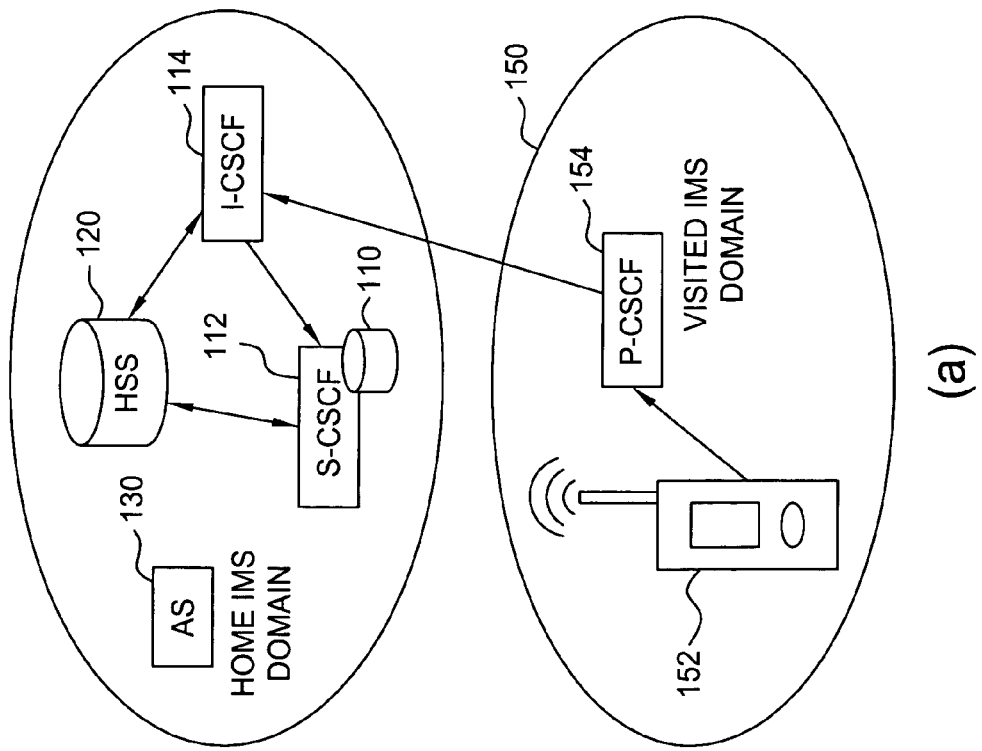
FIG. 2

```
<TriggerPoint>
<ConditionTypeCNF>1</ConditionTypeCNF>
<SPT>
  <ConditionNegated>0</ConditionNegated>
  <Group>0</Group>
  <Method>INVITE</Method>
</SPT>
<SPT>
  <ConditionNegated>0</ConditionNegated>
  <Group>0</Group>
  <SessionCase>1</SessionCase>
</SPT>
<SPT>
  <ConditionNegated>0</ConditionNegated>
  <Group>0</Group>
  <SIPHeader>
    <Header>From</Header>
    <Content></Content>
  </SIPHeader>
</SPT>
</TriggerPoint>
```

FIG. 5

```
<A>
  <B>1<b>
  <C><D>0<d><E>0<e><G>INVITE<g><c>
    <C><D>0<d><E>0<e><I>1<i><c>
  <C><D>0<d><E>0<e><H><K>From<k><L>alice@home<l><h><c>
<a>
```

FIG. 9 ced iFCs, do not exist. That is, in the current architecture an iFC needs to be stored for each service that a user has subscribed to for all users.

METHOD FOR DEPLOYING, PROVISIONING AND STORING INITIAL FILTER CRITERIA

FIELD OF THE INVENTION

The present invention relates to all-IP Mobile Networks and, more specifically, to a method for deploying, provisioning and storing initial filter criteria in a 3GPP IMS network.

BACKGROUND OF THE INVENTION

The $3^{rd}$ Generation Partnership Project (3GPP) is currently defining the IP Multimedia Subsystem (IMS); an architecture for next generation all-IP mobile networks. In the code division multiple access (CDMA) realm, the $3^{rd}$ Generation Partnership Project 2 (3GPP2) has adapted the same architecture under the name Multimedia Domain (MMD) for future all-IP CDMA2000 networks. The IMS architecture is based on the Session Invitation Protocol (SIP), by applying the SIP framework to the specific needs of a commercial wireless network. These needs include among other things Quality-of-Service (QoS) control in both access and core network, load balancing, as well as the support for billing and charging.

Briefly stated, IMS services run on dedicated application servers and are triggered for execution by the users' call control proxies. A call control proxy triggers service execution when it receives a SIP signaling message that matches the trigger condition that is associated with the respective service. That is, every time a SIP message for a certain user arrives at his or her call control proxy, the proxy checks the message against the trigger conditions of all services to which the user has subscribed. For each trigger condition that fires, the server delegates control to the application server that executes the actual service logic. Trigger points are the main components of so-called initial Filter Criteria (iFC). For each service that a user has subscribed to, their user profile contains one iFC. Each iFC contains at least a trigger point, the address of the application server to be contacted, the default handling in case the application server cannot be reached, as well as some user specific service data that the call control proxy sends to the application server upon service triggering. The IMS specifies the framework for service execution, including the language to form initial Filter Criteria, the XML dialect in which these iFCs are exchanged between two network elements, the format of the service triggering message (SIP), and a mechanism for application servers to access user specific service data from the Home Subscriber Server (HSS), the central subscriber data repository. The IMS does not, however, specify concrete services, neither does it specify concrete trigger conditions. What particular services to offer, how to implement, provision, and trigger them, is out of the scope of the IMS. Such an architecture enables a great deal of flexibility and opportunity for service differentiation to the service providers.

On the downside, this flexibility makes the deployment and provisioning of IMS services—and in particular their associated iFCs—a complex and challenging task. This is especially true because the 3GPP—with the focus on service execution rather than service deployment and provisioning— define iFCs purely as a user level concept. Currently, however, efficient methods and systems for the deployment and provisioning of IMS services, and in particular their associ-

SUMMARY OF THE INVENTION

The present invention addresses the various deficiencies of the prior art by providing a method for the efficient deployment and provisioning of IP Multimedia Subsystem (IMS) services. More specifically, the present invention provides a method for deploying, provisioning, and storing initial Filter Criteria (iFC) in, for example, a Mobile IP Network by decomposing iFCs into user specific and user independent parts.

In one embodiment of the present invention, Trigger point templates are defined and stored on a central IMS subscriber base referred to as the HSS, at service deployment time. At service subscription time, user specific parameters are provisioned, and at the time of user profile download from the HSS to the S-CSCF, trigger point templates and user parameters are assembled into concrete trigger points. The comparative analysis shows that the trigger point templates of the present invention are not only a natural way to provision services but are also a highly efficient mechanism both in terms of storage and run-time efficiency.

In accordance with an embodiment of the present invention, a method for the efficient storage of initial filter criteria (iFCs) for the deployment and provisioning of respective user services in a provider network includes decomposing the iFCs into user specific service parameters and global service data related to the execution of the respective user services such that each of the iFCs related to a respective user service only needs to be recorded in a storage device once for all users having access to the storage device and desiring the execution of the services. In this embodiment of the present invention, a placeholder is stored for each of the user specific parameters and the user specific parameters are respectively provided to the iFCs for execution of the respective user services by a respective user at the time of execution of the service.

BRIEF DESCRIPTION OF THE DRAWINGS

The teachings of the present invention can be readily understood by considering the following detailed description in conjunction with the accompanying drawings, in which:

FIG. 2a depicts a high level functional diagram of IMS registration in the IMS network of FIG. 1;

FIG. 2b depicts a high level functional diagram of an incoming call set-up in the IMS network of FIG. 1;

FIG. 5 depicts a high level Extensible Markup Language (XML) representation of a sample TP template in accordance with one embodiment of the present invention;

FIG. 9 depicts a simple XML tag compression representation for the TP template of FIG. 4, previously compressed using the XML tags as depicted in FIG. 5;

To facilitate understanding, identical reference numerals have been used, where possible, to designate identical elements that are common to the figures.

DETAILED DESCRIPTION OF THE INVENTION

The present invention advantageously provides a method for the efficient deployment and provisioning of IP Multimedia Subsystem (IMS) services. That is, the present invention provides various embodiments of a method for deploying, provisioning, and storing initial Filter Criteria (iFC) in, for example, a Mobile IP Network. Although various embodiments of the present invention are described herein with respect to a Mobile IP Network, the specific embodiments of the present invention should not be treated as limiting the scope of the invention. It will be appreciated by those skilled in the art and informed by the teachings of the present invention that the concepts of the present invention may be applied in substantially any network architectures utilizing IMS services.

Figure 1:
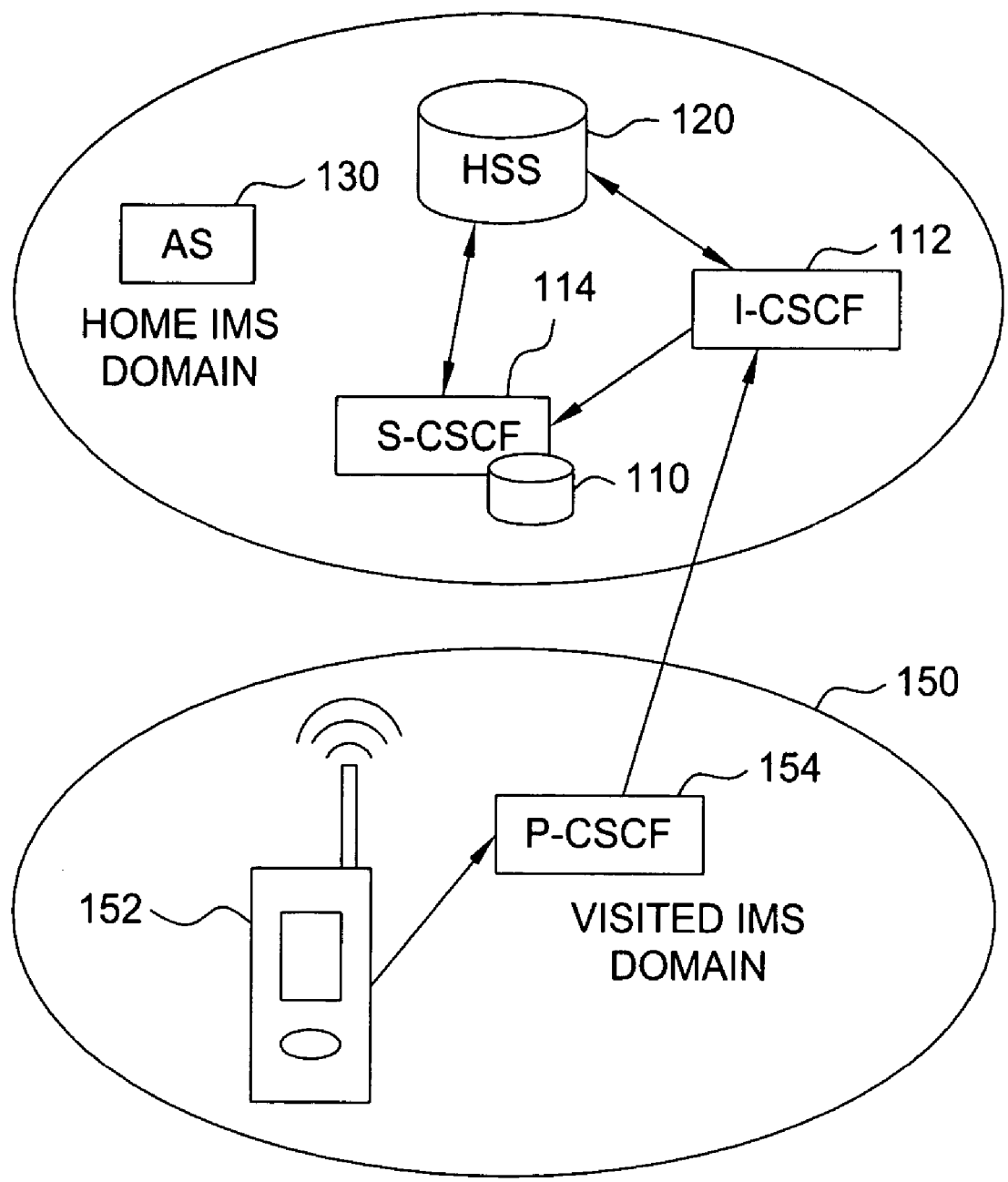
FIG. 1 depicts a high level block diagram of an IMS network where the concepts of the present invention may be applied.

Typically, an IMS network comprises a broad array of network elements, not all of which are relevant in the context of the discussion of the present invention. As such, the following discussion is restricted to those elements that play a role in service execution, or that are essential to an understanding of the general IMS architecture for purposes of the description of exemplary embodiments of the present invention. FIG. 1 depicts a high level block diagram of an IMS network 100 where the concepts of the present invention may be applied. The IMS network 100 of FIG. 1 comprises a Home Subscriber Server (HSS) 120 and an Application Server (AS) 130. FIG. 1 further depicts a visited IMS domain 150 comprising a mobile terminal 152.

The IMS network 100 and visited IMS domain 150 of FIG. 1 illustratively further comprise Call Session Control Functions (CSCFs) which operate as Session Invitation Protocol (SIP) proxies and communicate with each other, with the mobile terminal 152, and with other elements outside the IMS network (not shown) using SIP proxies. More specifically, the Interrogating CSCF (I-CSCF) 112 of FIG. 1 functions as an ingress router to a given IMS domain (i.e. the first point of contact for any communication from outside the network). Typically, every IMS network, such as the IMS network 100 of FIG. 1, includes at least one I-CSCF 112 however it is possible for an IMS network to include more than one I-CSCF, which may be listed as a domain's SIP proxies in a Domain Name Server (DNS).

In addition, every user is assigned, at the time of registration, a Serving CSCF (S-CSCF) 114 that serves as a respective SIP registrar. Each incoming SIP message traverses the user's respective S-CSCF 114, which delegates service execution if and when needed, and which communicates the SIP message to the P-CSCF 154. Similarly, mobile originated messages are also forwarded to a user's S-CSCF 114 for executing services as well. The S-CSCF 114 has an associated server 110 for storing data and for performing service execution (described in greater detail below).

Figure 12:
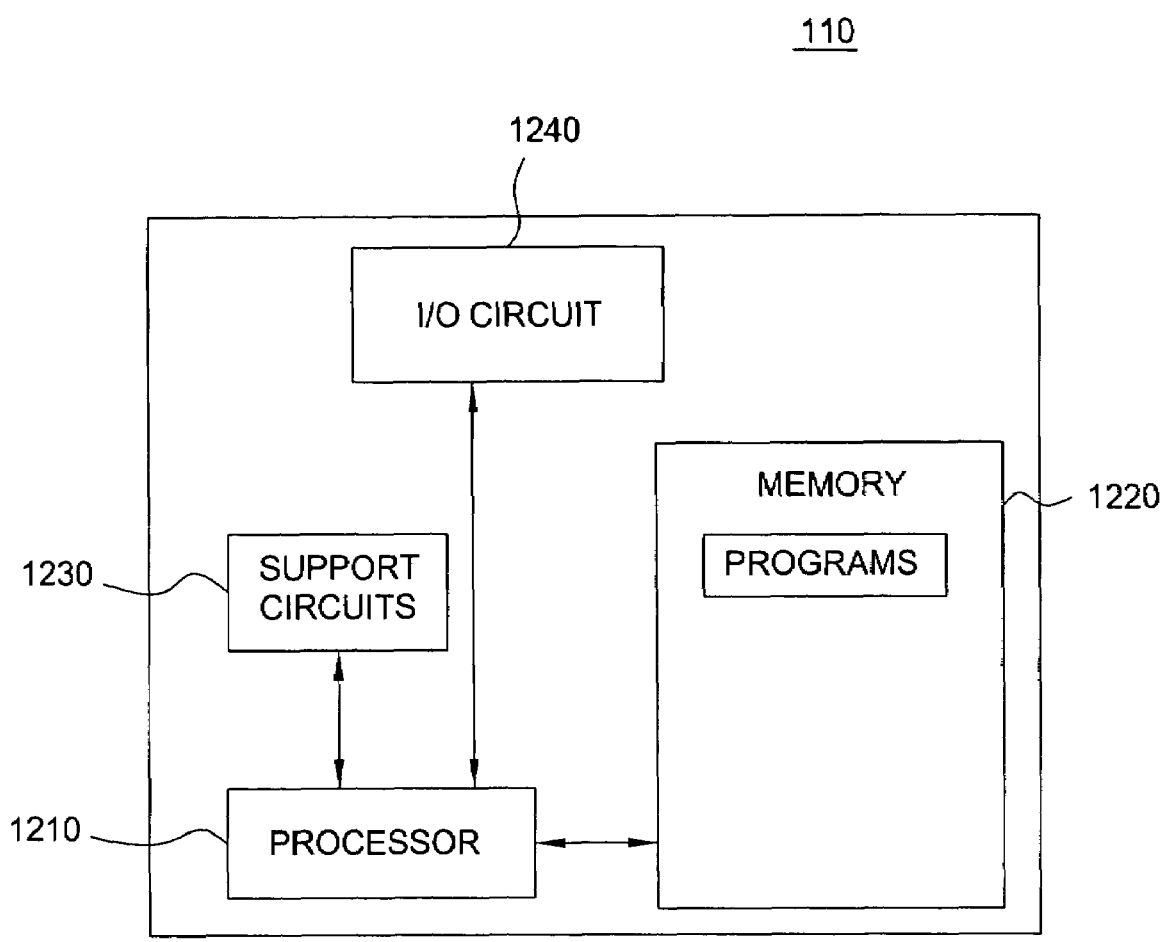
FIG. 12 depicts a high level block diagram of an embodiment of an S-CSCF server suitable for use in the IMS network 100 of FIG. 1.

FIG. 12 depicts a high level block diagram of an embodiment of an S-CSCF server suitable for use in the IMS network 100 of FIG. 1. The S-CSCF server 110 of FIG. 12 comprises a processor 1210 as well as a memory 1220 for storing the algorithms and control programs. The processor 1210 cooperates with conventional support circuitry 1230 such as power supplies, clock circuits, cache memory and the like as well as circuits that assist in executing the software routines stored in the memory 1220. As such, it is contemplated that some of the process steps discussed herein as software processes may be implemented within hardware, for example, as circuitry that cooperates with the processor 1210 to perform various steps. The S-CSCF server 110 also contains input-output circuitry 1240 that forms an interface between the various functional elements communicating with the S-CSCF server 110.

Although the S-CSCF server 110 of FIG. 12 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Referring back to FIG. 1, the Proxy CSCF (P-CSCF) 154 is the proxy that is topologically closest to the mobile terminal 152. Typically, the P-CSCF 154 is collocated with a Gateway GPRS Support Node (GGSN) of an underlying General Packet Radio Service (GPRS) network (not shown). The P-CSCF 154 runs in the visited domain 150 and is responsible for services such as QoS control in the access network and the generation of charging records.

The Home Subscriber Server (HSS) 120 is a central repository of all subscribers and their service data for a particular IMS network, such as the IMS network 100 of FIG. 1. The HSS 120 also contains for each registered user the address of the respective S-CSCF 114 that currently serves the user. In this manner, the HSS 120 is able to assist the I-CSCF 112 to find the appropriate S-CSCF 114 for incoming calls. In addition, the HSS 120 downloads the respective user profile to the S-CSCF 114 at registration, and returns the user's service data to the Application Server (AS) 130 on demand.

The Application Server (AS) 130 hosts the code for the services and executes the services. More specifically, a service is all functionality that goes beyond standard call set-up behavior, including, well-known services such as call forwarding, call barring, and voice mail, but also more advanced or IP-centric services such as media streaming, access network selection, or automatic reconnect. Service execution is triggered by an S-CSCF's 114 sending of an SIP INVITE message to the AS 130. After service execution, the AS 130 responds with another SIP INVITE back to the respective S-CSCF 114. The AS 130 is able to use the HSS 120 as a repository for service data which is able to be downloaded from the HSS 120 on demand.

The IMS service execution model is best explained by examining registration and call set-up. Registration is important because at registration time a registering user's service profile is downloaded to a respective S-CSCF 114. Then, at call set-up time, the user's services may be executed. FIG. 2a depicts a high level functional diagram of IMS registration in the IMS network 100 of FIG. 1, whereas FIG. 2b depicts a high level functional diagram of an incoming call set-up in the IMS network 100 of FIG. 1. It should be noted, however, that both scenarios are simplified (i.e., registration authentication is not shown as it is not relevant for the purposes of disclosing the present invention).

As depicted in FIG. 2a, during registration the mobile terminal 152 contacts the local P-CSCF 154 in the visited network 150, whose address it learned at the time of IP connectivity establishment. The P-CSCF 154 looks at the domain name of the SIP Uniform Resource Identifier (URI) to be registered, looks up an I-CSCF 114 for this domain in the DNS (not shown), and forwards the SIP REGISTER request to the mobile terminal's home domain. The I-CSCF downloads user information from the HSS 120 to determine if the user is already registered or not, and to learn what features an S-CSCF must implement in order to be able to serve this user. Assuming a first time registration, the I-CSCF then selects an appropriate S-CSCF and forwards the REGISTER message to the S-CSCF. The newly assigned S-CSCF registers its address with the HSS 120, and downloads the respective user profile. The profile, together with the address of the P-CSCF, is stored in the S-CSCF's local server 110.

As depicted in FIG. 2b, during call set-up an incoming call first arrives at an I-CSCF 114 functioning as a SIP inbound proxy. The I-CSCF 114 interrogates the HSS 120 for the address of the user's S-CSCF, and forwards the INVITE request to the respective S-CSCF. The S-CSCF checks the INVITE message against the trigger conditions of all services to which the user has subscribed. For each trigger condition that is identified, the S-CSCF delegates—in a prioritized, sequential order—service execution to the AS 130. If needed, the AS 130 is able to download service data from the HSS 120. After all services have been executed, the S-CSCF forwards the INVITE request to the P-CSCF, which in turn communicates the INVITE request to the mobile terminal 152. It should be noted that the mobile originated calls are forwarded from the P-CSCF to the S-CSCF before they are routed towards a far end destination. Consequently, service execution for mobile originated calls works in substantially the same manner as for the mobile terminated case described above.

Figure 3:
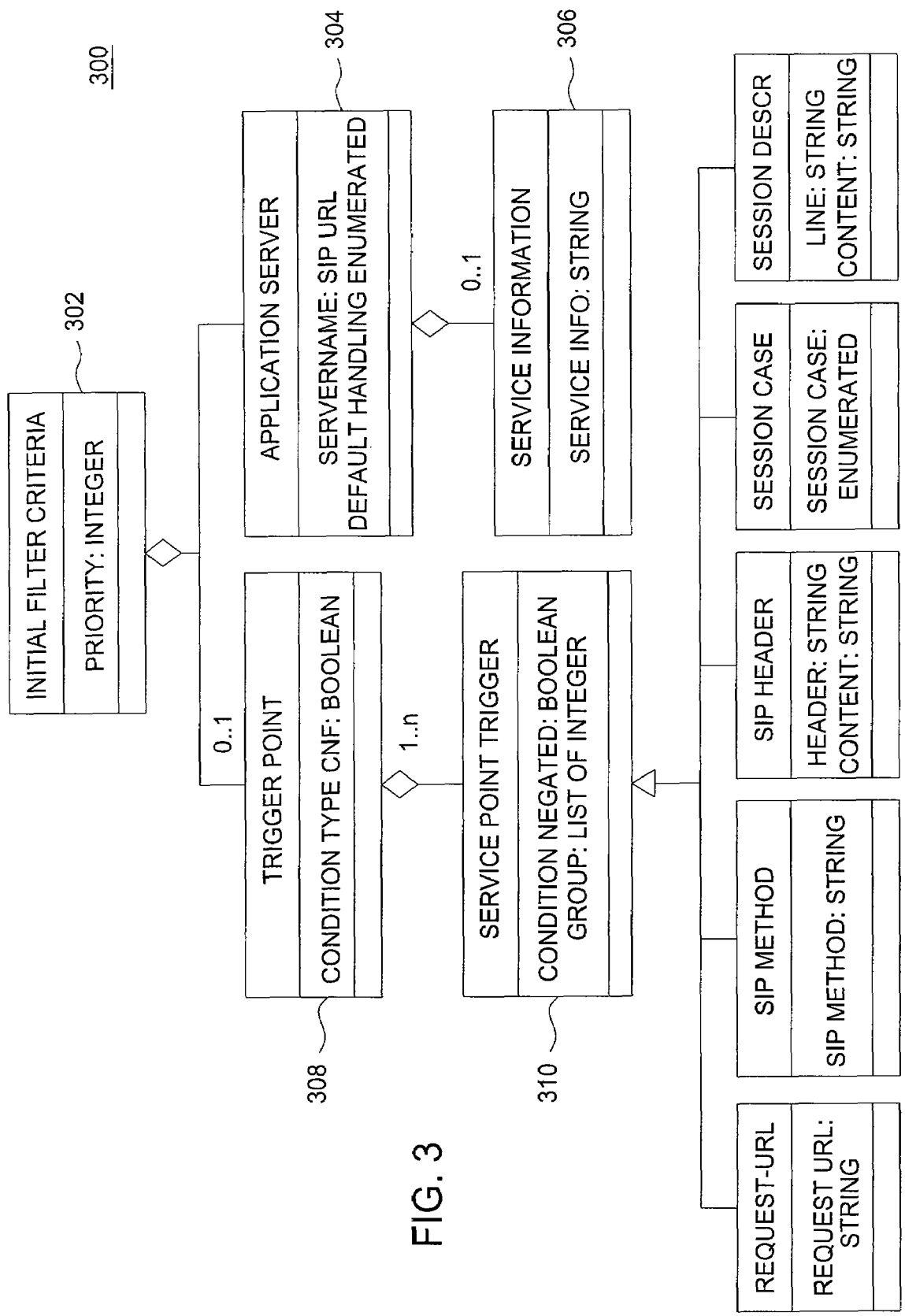
FIG. 3 depicts a high level Unified Modeling Language (UML) representation of an IMS initial Filter Criteria (iFC)

As described above, the S-CSCF downloads a user profile from the HSS 120 at the time of registration. The user profile for each user contains, among other things, an initial Filter Criteria (iFC) per subscribed service. FIG. 3 depicts a high level Unified Modeling Language (UML) representation of an IMS iFC in accordance with an embodiment of the present invention. As depicted in the iFC 300 of FIG. 3, each iFC has a Priority 302 assigned. The Priority value 302 is used to determine the order in which to execute services if several iFCs are identified upon receipt of a SIP message at the S-CSCF. Each iFC further contains exactly one Application Server component 304 that consists of the name of the AS that runs the service, a Default Handling component that indicates whether the session is to be released or not if the application server is unable to be contacted, and potentially a Service Information component 306 containing a Service Info character string. The S-CSCF sends this string to the AS when service execution is triggered. The Service Info character string may be used to transport user specific service data, such as a call forwarding number, to the AS.

Each iFC further contains, for example, a zero or one Trigger Point 308. A trigger point is a potentially complex logical condition on a SIP message. Technically, a trigger point is a Boolean expression in either conjunctive normal form (CNF) or disjunctive normal form (DNF) (i.e., either an ANDed set of ORed sets of atomic conditions, or an ORed set of ANDed sets of atomic conditions). The ConditionTypeCNF field indicates either of the two normal forms. A trigger point is made up of one or several Service Point Triggers 310 that represent single atomic conditions. For example, the ConditionNegated field indicates a potential negation, and the Group field lists all sets (ORed sets for CNF, ANDed sets for DNF) in which the atomic condition takes part. This is a useful feature to reduce redundancy as normalization of a logical condition tends to generate multiple occurrences of the same atomic condition for different ORed or ANDed sets.

There are typically five predefined atomic conditions, (1) one on the Request-URI of a message, (2) one on the SIP Method, (3) one on the presence or absence as well as the content of a SIP Header, (4) one on the Session Case, whether the service is to be executed for incoming or outgoing calls, and (5) one on the content of the Session Description (SDP) field of the message. As the on-the-wire format for the download of iFCs from the HSS to the S-CSCF, the 3GPP has defined an Extensible Markup Language (XML) dialect that maps the above structure to a set of XML elements. The internal storage format on both the HSS and the S-CSCF is out of the scope of the 3GPP standards, and left to the provider. Obviously, the main focus of the 3GPP is on what data comprises an iFC and in what format it is exchanged between HSS and S-CSCF. However, from a provider's perspective, an equally important question is how this data is provisioned; inventive methods of which are presented herein by the inventors below.

For some services, it is possible to define a Trigger Point that is used by all users that subscribe to the service. The following is an example of such a predefined trigger condition. The following example describes (in quasi natural language) a condition that triggers service execution for all outgoing (mobile originated) calls of a user:

Method="INVITE" and Session Case="Originating". (1)

Other services, however, require trigger conditions that also contain user specific settings that evidently are not known at the time of service deployment. To cover both kinds of services, the inventors herein propose to use Trigger Point Templates (TP templates) in accordance with the present invention. That is, the inventors propose to decompose iFCs into user specific and user independent parts for facilitating the storing, provisioning and downloading of initial filter criteria such that at least storage and run-time efficiency is improved. Consider the example of a call screening service that is to be triggered when a call comes in from a particular, user-defined caller. At service deployment time, the name of the caller to be screened is not known, however what is known is the general structure of the trigger point associated with the call screening service. To become more concrete, the call screening service needs to be triggered under the following condition, with <user-param> being a placeholder for the users' actual settings. This placeholder is filled in at the time of service subscription. The Trigger Point Template may be characterized as follows:

Method="INVITE" and Session Case="Terminating" and (Header="from" and content=<user-param>). (2)

The above "trigger point with holes" is an exemplary embodiment of what the inventors define as a Trigger point template (TP template), because it defines a template that may be instantiated to become a real trigger point by replacing the place-holding parameter(s) with actual value(s).

The following is an exemplary partial list of which portions of a trigger point are user independent and which portions are user specific:

1. The structure of the trigger point (i.e., the presence or absence of certain atomic conditions) is user independent. Consequently, the field ConditionTypeCNF, of the Trigger Point component, as well as ConditionNegated and Group of Service Point Trigger are all user independent as well, because they relate to the structure of the trigger point.
2. On the level of atomic trigger conditions, the fields SIPMethod, Header, SessionCase and Line within the components SIP Method, SIP Header, Session Case, and Session Description, respectively, are structural and thus user independent.
3. The RequestURI field of the Request URI component, the Content field of the SIP Header component, and the Content fields of the Session Description component all contain potentially user specific data.

Figure 4:
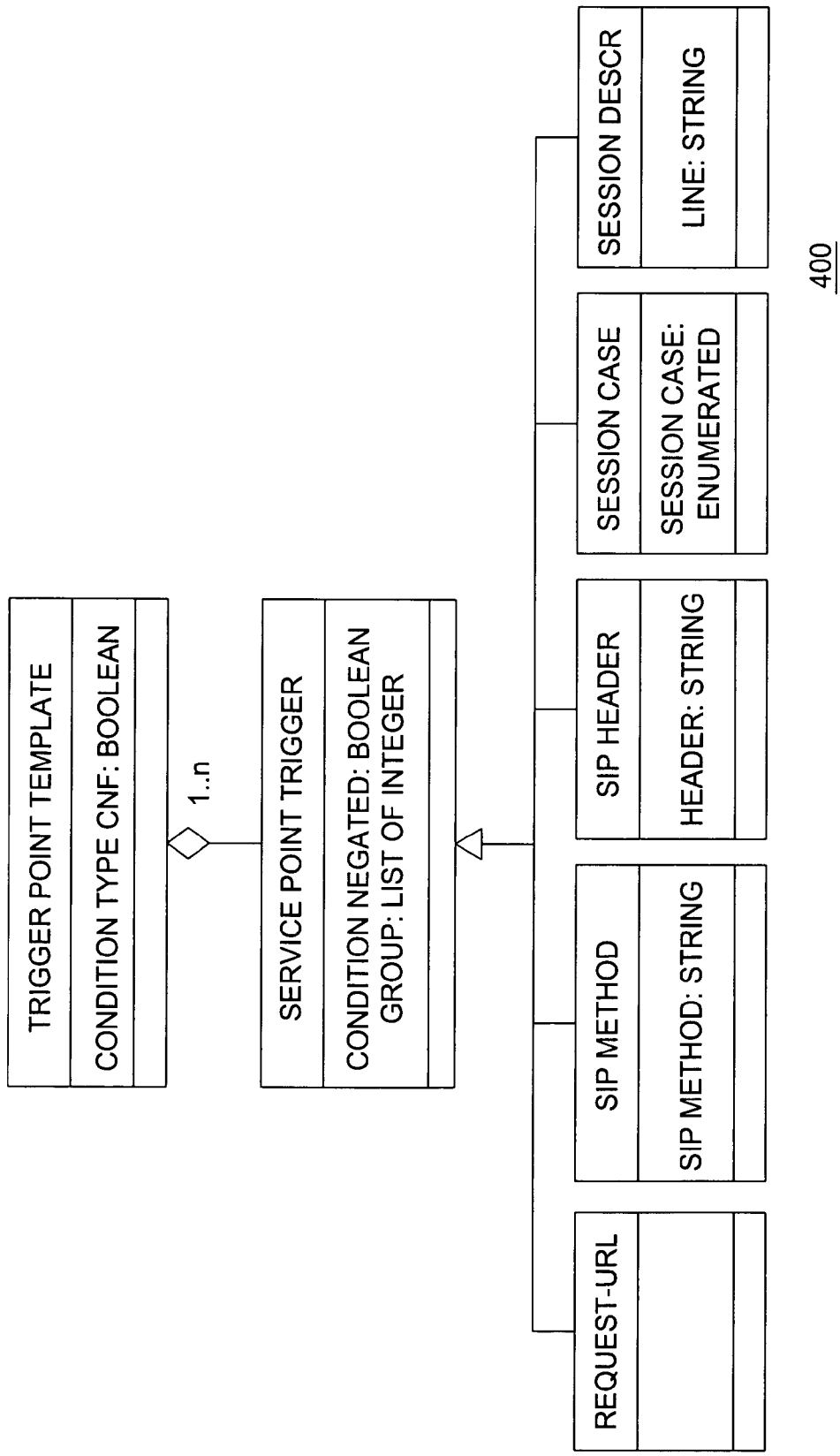
FIG. 4 depicts a high level Unified Modeling Language (UML) representation of a Trigger Point (TP) template in accordance with an embodiment of the present invention.

FIG. 4 depicts a high level Unified Modeling Language (UML) representation of a Trigger Point Template in accordance with an embodiment of the present invention. The Trigger Point Template 400 of FIG. 4 is similar to the trigger point portion of the UML representation of the iFC in FIG. 3 with the exception that the user specific data fields, such as the user specific data fields listed in paragraph three above, are missing. The addition of these fields in the Trigger Point (TP) Template 400 of FIG. 4 makes a TP template of the present invention a real trigger point. In accordance with various embodiments of the present invention, the TP templates may be stored in an HSS, such as the HSS 120 of the IMS network 100 of FIG. 1. For the storage of TP templates on the HSS, the inventors propose in one embodiment of the present invention an XML representation that allows filling in user specific data and hence instantiating them to real trigger points (in their standardized XML dialect) very efficiently. Although in the embodiment of the present invention described above, the inventors propose an XML representation for the storage of TP templates on the HSS, it will be appreciated by those skilled in the art informed by the teachings of the present invention that various other formats may be used to store the TP templates on the HSS. For example, the TP templates of the present invention may be further compressed using XMill or the like.

The XML representation of a TP template of the above described embodiment of the present invention implements the XML representation for trigger points and leaves out the missing user specific elements (i.e., the request URI of a Request-URI element, and the actual content of a Content element that is used within SIP Header and SessionDescription elements). However, the <Content>, </Content> start and end tags for Content elements are not omitted. This simplifies the instantiation routine that fills in user specific data in order to instantiate the TP template to a concrete trigger point.

FIG. 5 depicts a high level XML representation of a sample TP template in accordance with one embodiment of the present invention. In FIG. 5, the tags for empty Content element have been bolded for easy identification. Using the XML representation, the instantiation operation becomes very simple and efficient, because the holes in the TP template that need to be filled with user specific data are marked with placeholders. It should be noted however that storing a TP template in XML format is not optimal in terms of storage efficiency, as XML is a very verbose format meant for data exchange and not for storage, however, as the number of services offered by a provider can be expected to be rather limited—in the 100s at most—ease and speed of conversion clearly dominate storage efficiency.

Figure 6:
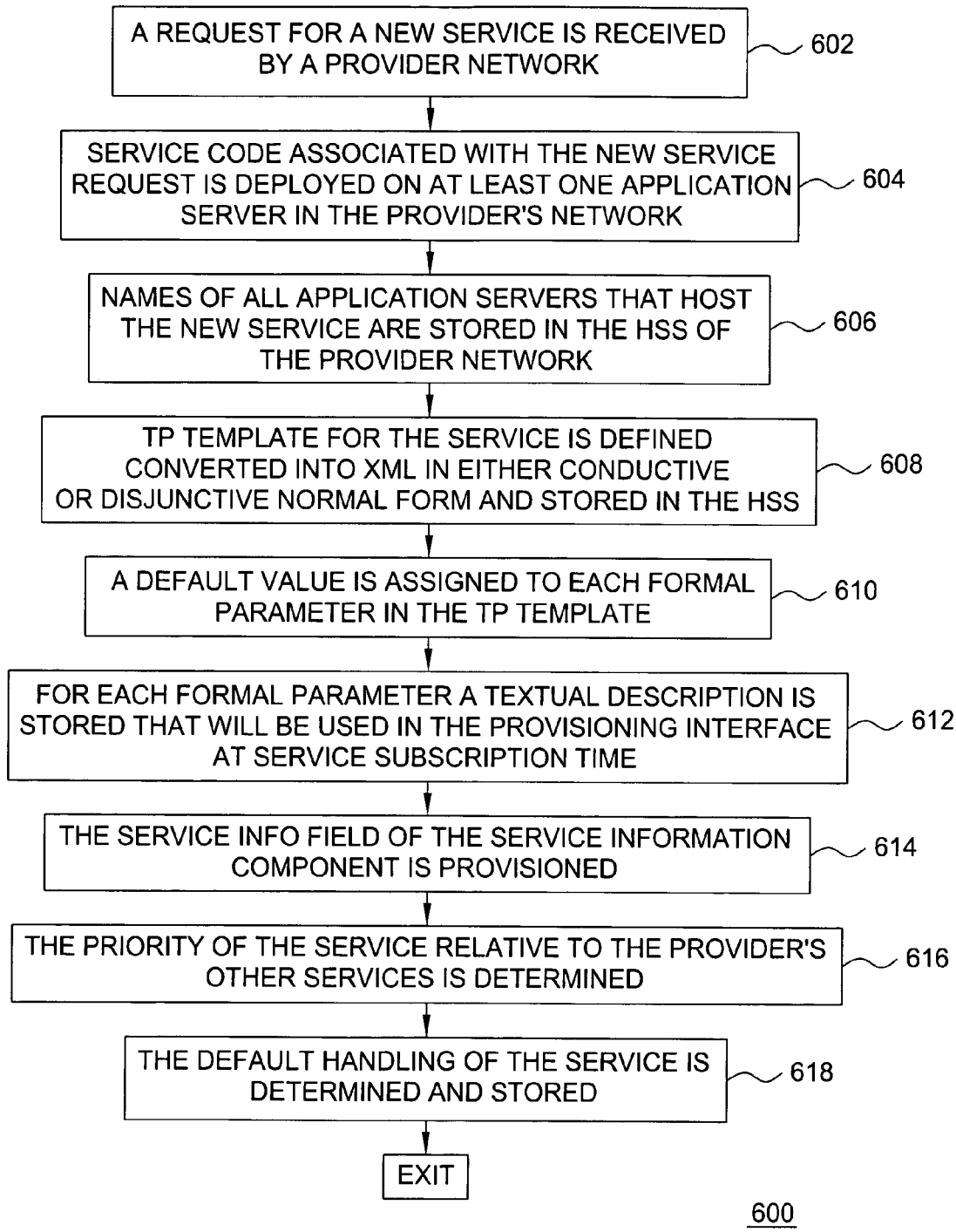
FIG. 6 depicts a high level block diagram of a method for deploying a new service in a provider network in accordance with an embodiment of the present invention.

FIG. 6 depicts a high level block diagram of a method for deploying a new service in a provider network in accordance with an embodiment of the present invention. The method 600 is entered at step 602 wherein a request for a new service is received by a provider network. The method 600 then proceeds to step 604.

At step 604, the service code associated with the new service request is deployed on at least one, or—if load sharing is desired—several application servers in the provider's network. The method 600 then proceeds to step 606.

At step 606, the names of all application servers that host the new service are stored in the HSS of the provider network. The method 600 then proceeds to step 608.

At step 608, a TP template for the service is defined, converted into XML in either conjunctive or disjunctive normal form, and stored in the HSS. The method 600 then proceeds to step 610.

At step 610, a default value is assigned to each formal parameter in the TP template. The method 600 then proceeds to step 612.

At step 612, for each formal parameter, a textual description is stored that will be used in the provisioning interface at service subscription time. The formal parameter in the sample TP template above could be named, for example, Calling Party's SIP URI. This textual description will indicate to the provisioner, who acts on behalf of the user, what data is supposed to be filled in. The method 600 then proceeds to step 614.

At step 614, the Service Info field of the Service Information component is provisioned. In the easiest case, this simply entails storing a name for the Service Info character string, such as a Call Forwarding Number or SIP URI. However, if the Service Info field is used to store more complex, structured information, a complete provisioning screen needs to be stored at the time of service deployment. The method 600 then proceeds to step 616

At step 616, the Priority of the service, relative to the provider's other services, is determined. Simply stated, this entails determining the position in the ordered list of already deployed services. These services represent an order listed, as each of them has been assigned a unique Priority value. Providers are advised to leave large enough gaps between the priority values of two adjacent services in order to avoid reassignment of these values when more and more services are deployed. The method 600 then proceeds to step 618.

At step 618, the Default Handling of the service is determined and stored. The value can be SESSION_TERMINATED for critical services without whose availability the session should be terminated, and SESSION_CONTINUED for services whose availability is less critical. The method 600 is then exited.

Figure 7:
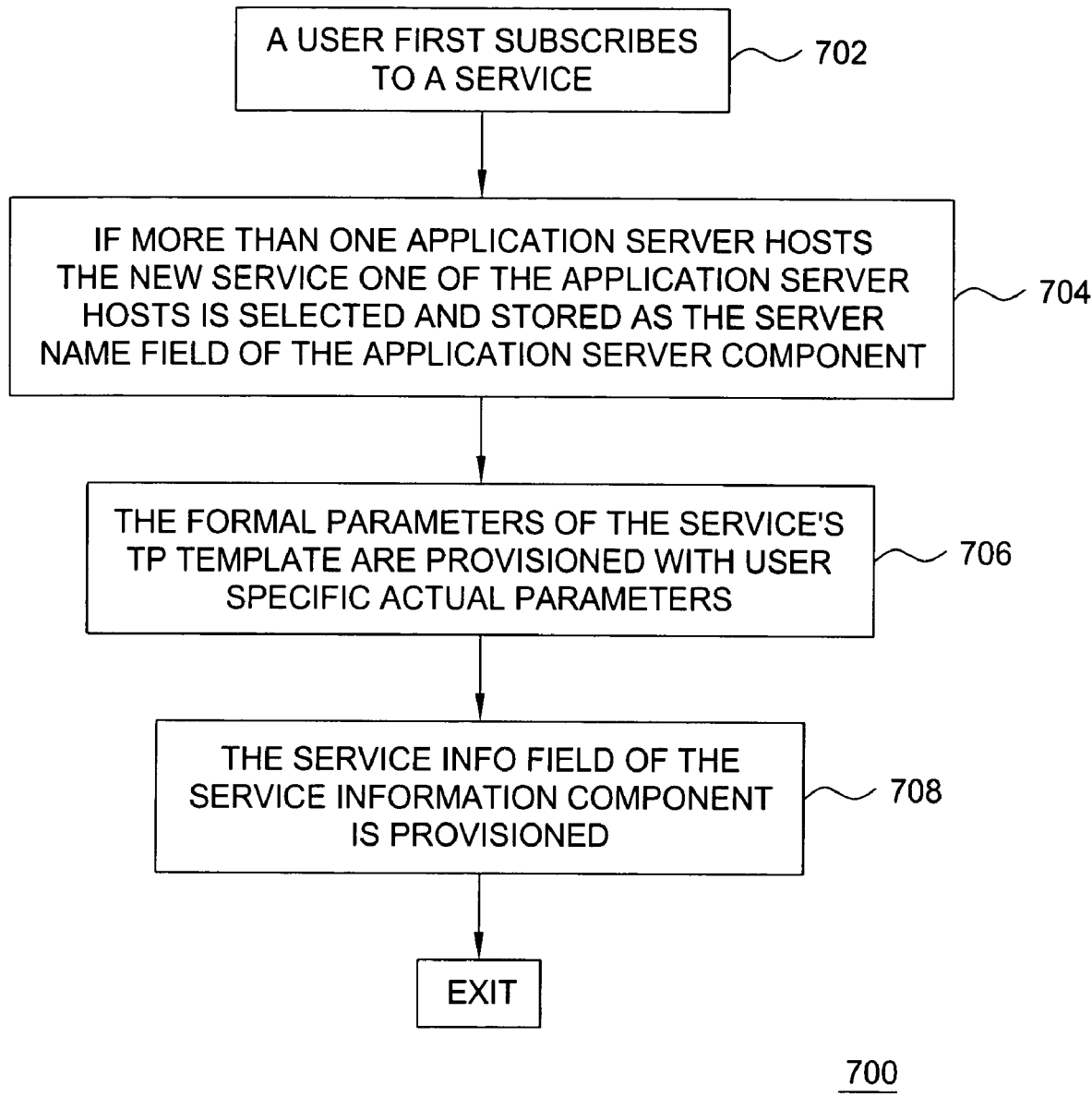
FIG. 7 depicts a high level block diagram of a subscription method for complementing the global service data with user specific service data to form a complete iFC in accordance with one embodiment of the present invention.

When a user subscribes to a service, the global service data (i.e., the user independent service data) stored in for example a TP template at deployment time has to be complemented with user specific service data in order to form a complete iFC. For example, FIG. 7 depicts a high level block diagram of a subscription method for complementing the global service data with user specific service data to form a complete iFC in accordance with one embodiment of the present invention. The method 700 of FIG. 7 is entered at step 702 wherein a user first subscribes to a service. The method 700 then proceeds to step 704.

At step 704, if more than one application server hosts the new service, one of the application server hosts is selected and stored as the Server Name field of the Application Server component. In alternate embodiments of the present invention, this step may be implemented to share loads among application servers by assigning different subscribers to different application servers. The method 700 then proceeds to step 706.

At step 706, the formal parameters of the service's TP template are provisioned with user specific actual parameters. For each formal parameter, the provisioner is presented with the name of the parameter (i.e., as described above in step 612 of the method 600) and the default value, if existent. If a default value is overridden, the actual value is stored, otherwise the field remains empty. The method 700 then proceeds to step 708.

At step 708, the Service Info field of the Service Information component is provisioned. Provisioning of the Service Info field of the Service Information component depends on whether only a name or an entire provisioning screen was stored at deployment time. In the former case, provisioning of the Service Info field of the Service Information component is substantially similar to the provisioning of one of the formal TP template parameters as described above. In the latter case, the stored provisioning screen is used to fill the Service Info field with user specific data. The method 700 is then exited.

Figure 8:
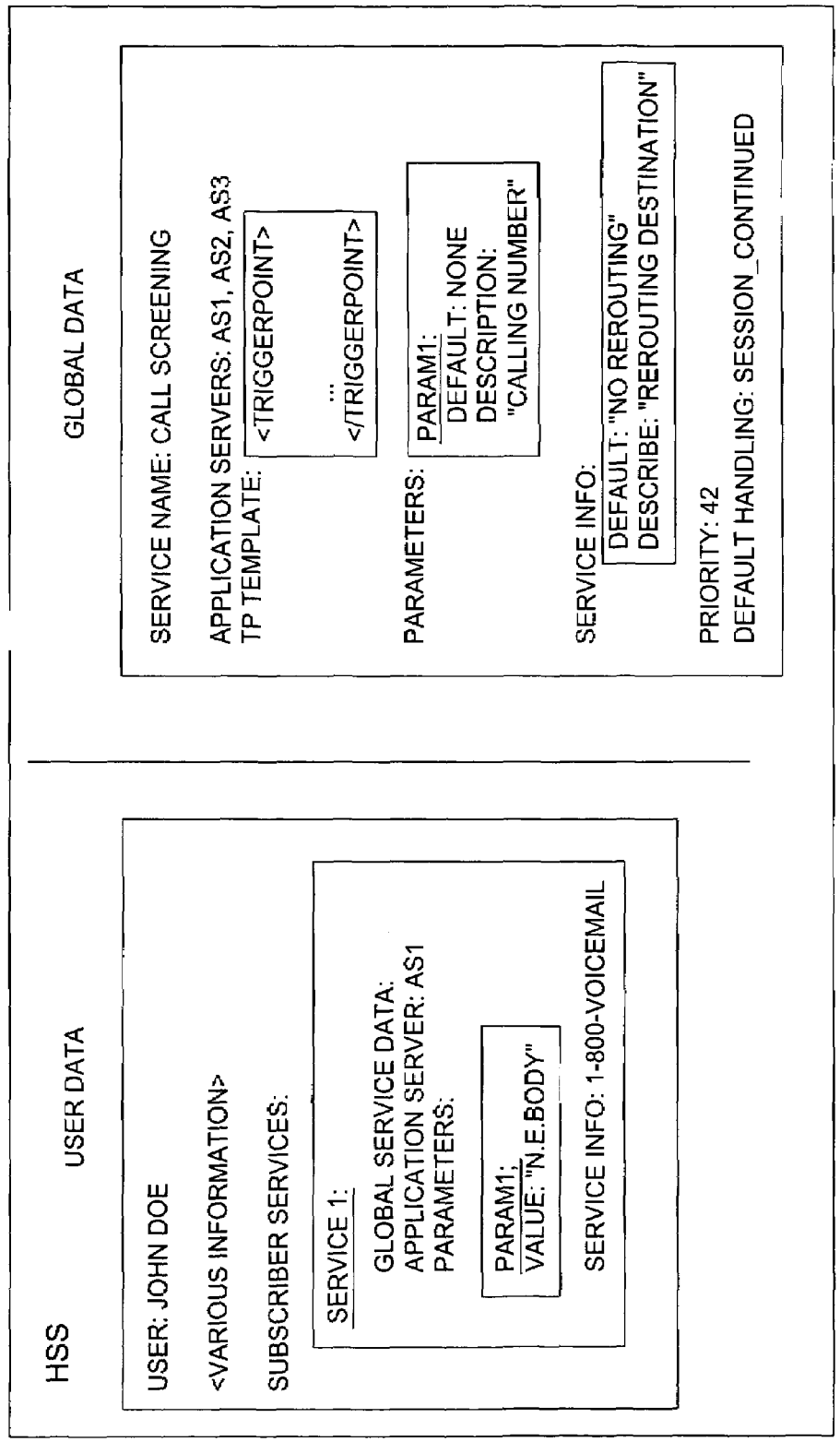
FIG. 8 depicts a high level block diagram of the contents of the HSS after the execution of the service deployment and subscription methods of FIG. 6 and FIG. 7.

FIG. 8 depicts a high level block diagram of the contents of the HSS after the execution of the service deployment and subscription methods of FIG. 6 and FIG. 7. The results of the deployment method of the present invention for an exemplary Call Screening service are depicted on the right hand side of FIG. 8 illustrating the global data portion related to the newly deployed service. It should be noted that for illustration purposes, the Service Info field was made available to a user for specifying if and where to reroute screened calls. As depicted in the embodiment of the present invention illustrated in FIG. 8, the default is that screened calls are not rerouted unless otherwise specified.

The results of the subscription method of the present invention for a user, John Doe, are depicted on the left hand side of FIG. 8, in the user data portion of the HSS. For illustrative purposes, in FIG. 8 it is assumed that the user, John Doe, gets assigned to application server AS1 for the Call Screening service. It is further assumed that the user wishes to screen incoming calls from a caller named "N.E.Body", and that these calls are to be rerouted to the user's voicemail.

As previously described above, a user profile is downloaded from the HSS to the assigned S-CSCF at registration time. Among other things, the user profile contains an iFC for each service to which the user has subscribed. The exchange format of the user profile, and hence of the iFCs, is a well-defined XML dialect. Because the different components of an iFC are stored on two different layers (i.e., a global, user independent layer, and a user specific layer) these components need to be assembled into one homogeneous XML document before their download to the S-CSCF.

As far as trigger points are concerned, the assembly corresponds to an instantiation of a TP template to a concrete trigger point. Assuming that the user specific parameters for a certain service are stored in the array UserParam that has the proper number of entries, in an embodiment of the present invention, the operation may be described in pseudo code as follows:

let index←1 scan TP template for first occurrence of XML tag <RequestURI> or <Content> while tag found, do if <RequestURI> tag found, then
    insert UserParam[index] between <RequestURI> and </RequestURI> tags
    else
    insert UserParam[index] between the <Content> start tag and the </Content> end tag.

let index←index+1
    scan TP template for next occurrence of XML tag <RequestURI> or <Content>.

The assembly of the remaining components of an iFC, for example, the ApplicationServer and ServiceInformation components with the attributes ServerName, DefaultHandling, as well as ServiceInfo, respectively, is straightforward. More specifically, the attributes ServerName and ServiceInfo are taken from the user data part of the HSS, whereas the attribute DefaultHandling is taken from the global data part as depicted in FIG. 8.

The inventors determined that Trigger point templates are not only a natural way for service deployment and provisioning, but they also allow for very memory efficient storage of IMS user profiles. From a data compression point of view, the separation of a trigger point into a TP template and user specific settings is a dictionary based compression technique, with the set of stored TP templates forming the global dictionary. To quantify the storage efficiency of the TP template approach, the inventors analyzed and compared the TP template approach of the present invention with the storage efficiency of three alternative techniques namely, Uncompressed XML storage, Simple XML tag compression and XMill compression.

Assume that at the time of service subscription the user specific settings where filled into the TP template and the resulting concrete trigger point was stored as a plain XML string on the user data level. This means that the instantiation process for iFC assembly needs to be performed only once at service subscription time. The resulting storage of trigger points as plain XML strings is what is considered by the inventors as uncompressed XML storage. This approach is the most run-time efficient approach since the trigger points are already in the proper format for download to the S-CSCF, however, it is also the least storage efficient approach because in uncompressed XML storage, the same TP template is duplicated for every user who subscribes to the service. As such, this approach may serve as a benchmark for alternative storage options.

In contrast, the basic idea of the simple XML tag compression mechanism is to replace the lengthy XML tags in a trigger point with short abbreviations. This is possible because the set of allowed tags for a trigger point in XML representation is predefined and very limited. To become more concrete, the entire trigger point vocabulary compresses only twenty-six (26) different tags. Consequently, a single printable character is big enough to represent any of these 26 strings. An example of such mapping representation is depicted in Table 1, which follows:

TABLE 1

| Mapping table for simple XML tag compression | |
|---|---|
| tag or label | code |
| TriggerPoint | A |
| /TriggerPoint | a |
| ConditionTypeCNF | B |
| /ConditionTypeCNF | b |
| SPT | C |

TABLE 1-continued

Mapping table for simple XML tag compression

| tag or label | code |
|---|---|
| /SPT | c |
| ConditionNegated | D |
| /ConditionNegated | d |
| Group | E |
| /Group | e |
| RequestURI | F |
| /RequestURI | F |
| Method | G |
| /Method | g |
| SIPHeader | H |
| /SIPHeader | h |
| SessionCase | I |
| /SessionCase | I |
| SessionDescription | J |
| /SessionDescription | J |
| Header | K |
| /Header | k |
| Content | L |
| /Content | l |
| Line | M |
| /Line | m |

In order to keep XML tags and labels distinguishable from free text, the brackets "<" and ">" are not replaced. Only the inner part of the tags and labels are replaced. For example, FIG. 9 depicts a simple XML tag compression representation for the TP template of FIG. 4, previously compressed using the XML tags as depicted in FIG. 5, instantiated with the user parameter "alice@home". As evident in FIG. 9, the brackets in the previous XML representation of FIG. 5 are not replaced or removed in the simple XML tag compression representation, but instead the codes are put in place of the previously applied lengthy XML tags.

In further contrast, XMill compression is a publicly available XML document compressor that groups together and compresses elements of the same type. It is widely known as one of the most if not the most storage efficient generic XML compression mechanisms. XMill reorders the XML elements of a document into groups of same type elements, and then performs GZIP compression on the reordered document. On the reordered document, GZIP can find more similarities than on the original document, and thus achieve a better compression rate. On large XML documents, XMill typically achieves compression rates in excess of 80%, twice the compression rate of general-purpose GZIP compression. XMill is representative of a sophisticated XML compression mechanism that achieves very good compression rates.

For the comparison of the various compression methods described above, the inventors measure the average storage space it takes to store one trigger point of a certain complexity. To measure the complexity of a trigger point, its number of atomic conditions (Service Point Triggers), n, is used. The focus is on trigger point storage only and the other components of an iFC are disregarded. The reason for this is twofold:

1. The trigger point storage is orthogonal to the way the other parts of an iFC are stored. That is trigger points may be stored as uncompressed XML documents on the user level, and still store the Default Handling as shared, global data. Hence for the sake of a fair comparison, the comparison is restricted to trigger point storage only.
2. Trigger points are by far the most storage-consuming components of an iFC. More specifically, the non-trigger point components of an iFC are in the following range of storage consumption:

a. Priority: 2 Bytes are more than enough to assign different priorities to all services in a carrier's network;
   b. Server Name: As all application servers run in the carrier's trusted domain, their number will be limited, and all servers will typically be listed in a global configuration table on the HSS. In a real network, indexes of 2 Bytes length will be long enough to refer to all application servers that run in the particular IMS network;
   c. Default Handling: Because this field can only have two different values (SESSION_CONTINUED, SESSION_TERMINATED), it can be stored in 1 bit;
   d. ServiceInfo: This is the only field of variable length. Its size depends on what information it contains for a particular service. However, this field's size can safely be assumed to be limited because the IMS has devised another mechanism to download bigger blobs of data from HSS to S-CSCF. Hence, an average length of a few tens of Bytes for, for example, a call forwarding number, seems realistic.
   e. In total, the average required storage space for the non-trigger point components of an iFC can be expected to be in the range of a few tens of bytes.

For performing the comparisons of the compression methods, the inventors used a generator to create random TP templates. In the random TP templates, all Service Point Triggers occur with the same relative probability. Double negated expressions are not allowed in order to avoid artificially complex predicates. The generator takes as input the desired TP template complexity, n, creates a combined logical predicate that consists of n atomic conditions (Service Point Triggers), normalizes this predicate to both conjunctive and disjunctive normal forms, transfers them into their XML representations, and selects the shorter one.

Using the TP template generator, 1000 TP templates were generated for each complexity value of n between 1 and 20. Then, for the approaches uncompressed XML storage, simple XML tag compression, and XMill, each of the TP templates were instantiated to a concrete trigger point, the resulting trigger point was compressed (except in the case of uncompressed XML storage), and the length of all 1000 resulting trigger points per complexity n were averaged. As far as user specific data is concerned, the inventors assumed character strings of length 10. The parameters described above are realistic average values for fields such as SIP URIs and user names containing wildcards. However, its significance is fairly limited as the length of the total trigger point is strongly dominated not by the user specific parts, but by the length of the TP template.

For the TP template approach of the present invention, the generated TP templates were not instantiated but their lengths were averaged per fixed complexity value n. At the same time, the number of user parameters in each TP template was averaged such that the storage space required by the user specific strings could be accounted for.

Figure 10:
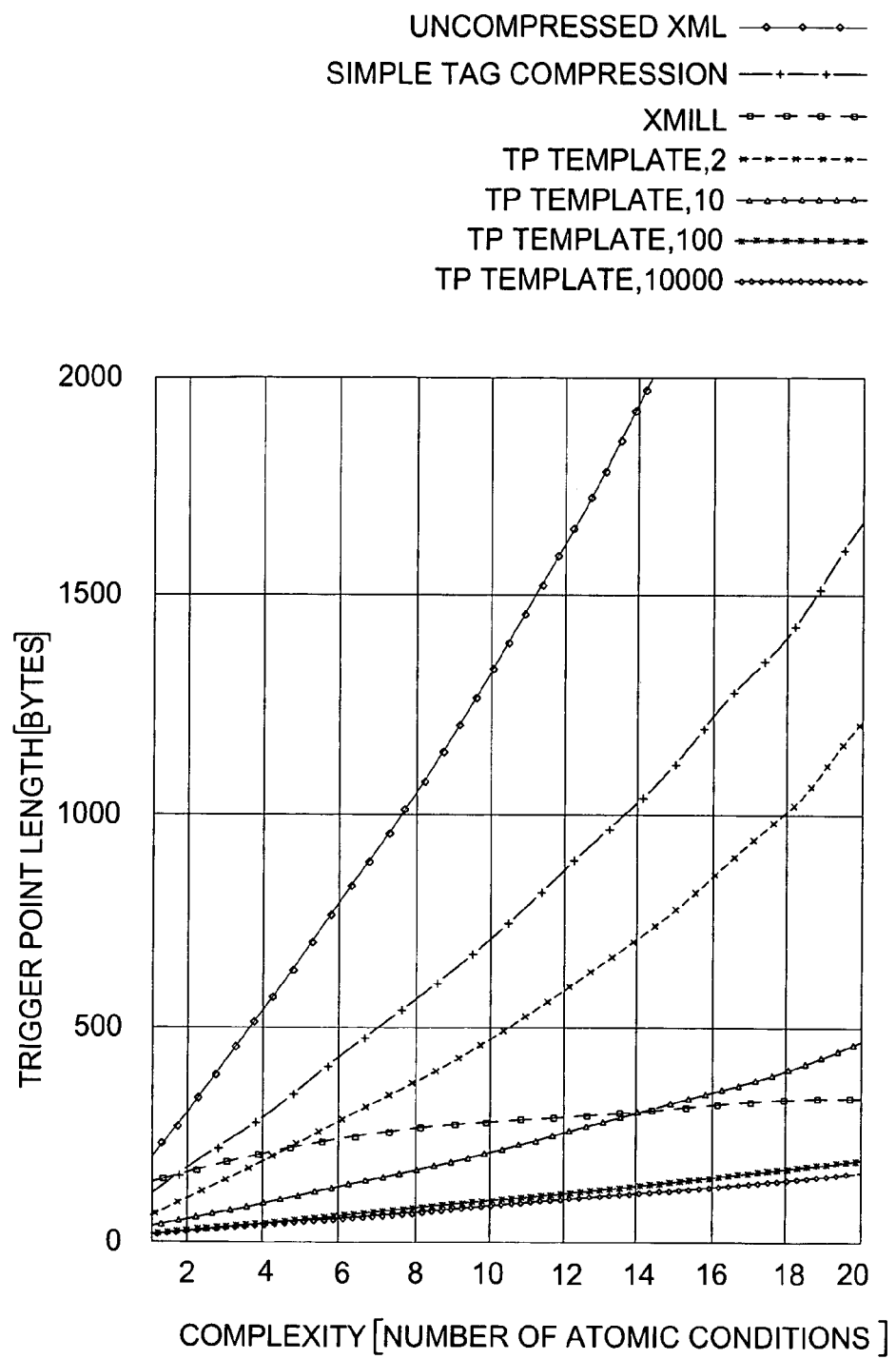
FIG. 10 depicts a graphical representation of the average length of trigger points for a given complexity, for each of the four compression methods, uncompressed XML storage, simple XML tag compression, XMill, and the TP templates method of the present invention.

FIG. 10 depicts a graphical representation of the average length of trigger points for a given complexity, for each of the three compression methods, uncompressed XML storage, simple XML tag compression, XMill, and for the TP template method of the present invention. For the TP templates approach, graphs for several different TP template dictionaries vs. subscriber base configurations are also depicted (described in further detail below). As described above, the trigger point complexity was varied from n=1 to 20 and the y-axis maximum was set to 2000 Bytes. In a real system, the average complexity is usually on the lower side, perhaps in the range of a few atomic conditions, however a big complexity range is displayed to show and compare the asymptotic behavior of the different compression methods.

As evident in FIG. 10, the graph for uncompressed XML exceeds the y-axis maximum of 2000 Bytes approximately at a complexity of n=14. For n=20, the average trigger point length is about 3180 Bytes (not shown). In the depicted range of n between 1 and 14, the graph seems to grow almost linearly. It should be noted, however, that the graph grows at a much faster rate than a linear rate outside the range of FIG. 10. For example, for n=30, the average length of a trigger point equals 6640 Bytes, which is significantly more than a linear extrapolation would indicate.

For simple tag compression, as depicted in FIG. 10, a compression rate of about 64% was achieved compared to uncompressed XML representation.

The graph for XMill compression starts at a trigger point length of 126 bytes for n=1 and then grows slowly to an average length of 364 bytes for n=20. As a matter of fact, the growth rate decreases as n increases. For example, from n=1 to n=3, the average trigger point length grows by 50 bytes, whereas from n=18 to n=20, the growth has slowed down to 26 bytes. Evidently, the longer the trigger points the better compression rate that can be achieved with XMill. One reason is that, the larger the XML document, the XMill compression method is able to find more similarities and compress them.

With the TP template method of the present invention, only the user specific part of a trigger point is stored on the user level, whereas all the TP templates are stored in a common global table. However, it would not be fair to only consider the user level data for the comparison in this section. Instead, the space needed for the global TP template storage has to be accounted for as well. As such, the inventors divided the size of the TP template, $S_{tmpl}$, by the number of subscribers, $n_{tmpl\_user}$, who use it, and added this value to the size, $S_{params}$, of the user specific parameters. By so doing, the burden of the TP template is equally distributed across all of its users. In addition, the inventors added 2 Bytes for the index that is stored on the user level and points into the global TP template dictionary. The resulting address space of 64K is more than enough for any realistic TP template dictionary. Thus, the size of a trigger point, $S_{tp}$, may be computed according to equation one (1), which follows:

$$S_{tp} = \frac{S_{tmpl}}{n_{tmpl\_user}} + S_{params} + 2. \quad (1)$$

On average, the number of users of a given TP template, $n_{tmpl\_user}$, is the ratio of numbers of users, $n_{users}$, over the number of templates in the dictionary, $n_{tmpl}$, times the average number of subscribed services per user, $n_{serv}$, which is characterized according to equation two (2), which follows:

$$S_{tp} = \frac{n_{tmpl}}{n_{users} \cdot n_{serv}} S_{tmpl} + S_{params} + 2. \quad (2)$$

For the simulation described herein, the inventors used the same TP template dictionaries as described above. That is, for a fixed complexity, n, 1000 trigger points were randomly generated and the length averaged to determine $S_{tmpl}$, and the number of user parameters to get $S_{params}$. As far as the factor $n_{tmpl\_user}$ is concerned, the inventors have depicted graphs in FIG. 10 for the four values 2, 10, 100, and 10 000. The four graphs are labeled "TP template, 2", "TP template, 10", "TP template, 100", and "TP template, 10 000", respectively. The smallest feasible value for $f_{tmpl\_user}$ is 1, describing a situation where every TP template, and thus every service, is used by only one user. In this case, the graph for TP template storage of the present invention is substantially similar to the graph for plain XML storage, except for the 2 Bytes needed for the reference into the global TP template table in accordance with the present invention. This is because the cost for the global TP template storage is borne by only one user, and the combination of TP template and user parameters equals the plain XML trigger point stored on the user level.

For a value of $n_{tmpl\_user}$=2, (i.e., when a service is subscribed by only 2 users) the storage saving is almost 50%. The $n_{tmpl\_user}$ independent factor, $S_{params}$+2, in Equation (1) above, however, slightly reduces the gain. Increasing $n_{tmpl\_user}$ to 10 leads to another storage gain of about 57%, compared to $n_{tmpl\_user}$=2. At this range, the factor $S_{params}$ starts to have a significant impact on the total size of a trigger point. Finally, the curves for $n_{tmpl\_user}$=100 and $n_{tmpl\_user}$=10000 lie very close to each other. This is due to the factor $S_{params}$ that dominates Equation (1) for increasing values of $n_{tmpl\_user}$. Hence, any further increase of $n_{tmpl\_user}$ would lead to a marginal further storage gain only.

Again, for the experiments described above, the inventors assumed user specific parameters to have an average length of 10 Bytes. Even though this seems a reasonable value, a different average value would have varying effects on the results. For example, the three compression methods, uncompressed XML storage, simple XML tag compression, and TP template dictionary, would all benefit the same from smaller user parameters in absolute terms. Relatively, however, the curves would move apart some more, as the gain benefit greater an already efficient mechanism than a less efficient one. Similarly, all three approaches would suffer a similar amount from bigger user parameters, but the curves would move closer together. As XMill compresses all the trigger point data including user specific parameters, however, it would benefit less from smaller user parameters, moving its curve up compared to the other approaches. On the other hand, XMill would be hit less by bigger parameters, moving its curve down compared to the other approaches.

From the experiments performed, it is clear that the TP template method of the present invention is not only a natural basis for service provisioning in the IMS, but also for the efficient storage of millions of trigger points in the central HSS. Considering the fact that an HSS is as central repository for up to tens of millions of users and that each user typically subscribes to several services, a moderate difference in the average storage consumption of a trigger point can multiply to a huge difference in total storage requirements. Further consider that data replication—which any HSS implementation needs to use in order to achieve the stringent reliability requirements—additionally multiplies the total storage space.

The inventors further investigated the Run-Time Efficiency of the TP template method of the present invention using the same compression methods, uncompressed XML storage, simple XML tag compression, XMill, and the TP template dictionary of the present invention. For each trigger point complexity value, n, between 1 and 20, the inventors measured the time it takes each approach to (1) read in a (compressed) trigger point from a file; and (2) convert it into plain XML representation, ready for download from the HSS to the S-CSCF. The first step is roughly comparable with the time it would take to read the same entry from a disc based database system. Evidently, the second step is not needed for uncompressed XML storage, as with this approach the trigger points are stored in the same format they are exchanged between HSS and S-CSCF. The results for uncompressed XML storage indicate the pure data reading portion of the task, thus providing a lower bound for all other approaches.

Because the inventors, in one embodiment, implemented Java for writing the TP template implementation, Java implementations of the other approaches were also needed in order for the comparison to be fair. For uncompressed XML storage as well as simple tag compression, the implementations were straight-forward. XMill, in contrast, is only available as C++ code, which could not be used. However, because XMill first reorders an XML document, and then runs GZIP on it, the additional reordering process is known to add about 10% overhead to pure GZIP execution. Hence, the performance of the Java GZIP implementation that comes with the Java Development Toolkit was first measured, and then 10% was added to the results to compute the XMill performance.

To mitigate the effects of occasional performance spikes due to concurrent processes that the operation system runs, periodical Java garbage collection, and the like, the inventors introduced two levels of randomness in the order in which the tests were performed, so that any periodical CPU overload situations were equally distributed across all measured configurations. More specifically, the test consisted of 20 000 consecutive runs. In each run, a complexity value between 1 and 20 was randomly generated, 50 TP templates of this complexity were generated, the TP template were instantiated, the TP template were converted and stored, and then the time it took for each approach to read them in and convert them into downloadable XML format was measured. For the TP template approach, only the user parameters were stored on secondary storage, assuming the HSS could keep the TP template dictionary in main memory. The time for reading in the user parameters and filling them into the right TP template was measured. By randomly selecting a complexity value in each run, periodical background execution spikes were made to impact each complexity value to almost the same extent. After 20,000 runs, there was an average of 1000 runs per complexity value.

In each run, the order in which uncompressed XML, simple tag compression, XMill, and TP template read-in and conversion was performed was randomly determined. In this manner, an average of 1000 measurements per trigger point complexity per approach was obtained that were averaged out to show a single run-time vs. trigger point complexity value per approach.

Figure 11:
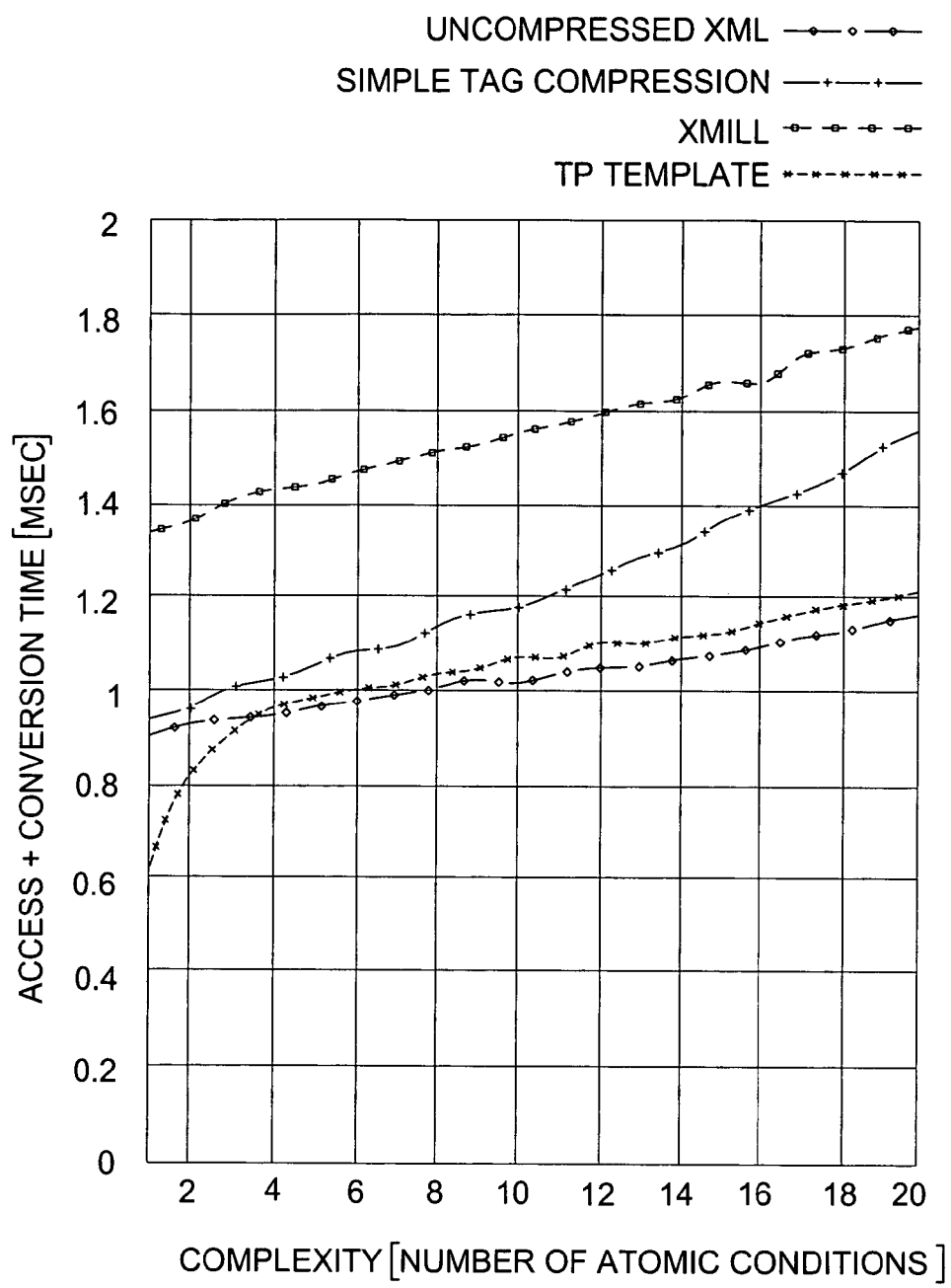
FIG. 11 depicts a graphical representation of the results of run-time performance tests for each of the compression methods, uncompressed XML storage, simple XML tag compression, XMill, and the TP templates method of the present invention.

FIG. 11 depicts a graphical representation of the results of the run-time performance tests described above for each of the compression methods, uncompressed XML storage, simple XML tag compression, XMill, and TP templates. In FIG. 11, the run-time (access+conversion time) is plotted versus the complexity value. As depicted in FIG. 11, for the most part uncompressed XML is the fastest approach, because trigger point read-in and conversion is reduced to the read-in part of the task. However, for small complexity values between 1 and 3 this approach is outperformed by the TP template approach. The graph for uncompressed XML storage grows slowly from 0.9 ms to 1.17 ms per trigger point. The slow increase in execution time for growing trigger point complexity is due to the increasing number of blocks that a trigger point consumes and that need to be read.

Simple XML tag compression performs worse than uncompressed XML, but better than XMill in the considered complexity range. Due to its fast growing asymptotic behavior, simple tag compression converges towards XMill for highly complex trigger points, but it does not reach it within the considered range of complexity of FIG. 11.

XMill shows the worst run-time performance of all of the considered approaches. XMill starts with 1.33 ms for trigger points of complexity n=1, and grows to 1.79 ms for n=20. However, to put these values into proportion it should be noted that the performance penalty is in the range of 30-35% increased execution time, compared to uncompressed XML storage.

As depicted in FIG. 11, for small complexity values between 1 and 3, the TP template approach even outperforms uncompressed XML storage even keeping in mind that the uncompressed XML storage approach requires no conversion at all but only file access to read in the trigger point. An explanation is that for the TP template method of the present invention, only the user specific data is stored in a file while the TP template dictionary is kept in main memory. Some low complexity trigger point templates do not contain any user dependent data, and thus no file access is required because the TP template already is a concrete trigger point. In these cases, TP template storage is even faster than uncompressed XML storage. For bigger complexity values, however, the likelihood of a trigger point not to contain user specific data approaches zero, thus requiring file access and leading to a performance that is within a 5% range worse than uncompressed XML storage.

As such and as depicted in FIG. 11, it is evident that the TP template method of the present invention performs almost as well as uncompressed XML storage with respect to run-times for complexity values greater than 3. For a complexity between 1 and 3, the TP template method of the present invention even outperforms uncompressed XML storage because it completely eliminates file access for a certain percentage of simple trigger points.

In summary, the TP template method of the present invention combines high storage efficiency with very good runtime performance. This combination makes the TP template method of the present invention the preferable approach for trigger point storage from the efficiency perspective.

In alternate embodiments of the present invention, the TP template method of the present invention may be combined with parameter compression to further increase the storage efficiency of the present invention. For example, within the concepts of the present invention described above, the user level parameters are stored uncompressed, because it is assumed that they consume a small storage space. However, in alternate embodiments of the present invention, the user parameters may be compressed using any off-the-shelf compression algorithm (e.g., GZIP).

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for efficient implementation of initial filter criteria (iFC) related to a respective user service in a provider network, comprising a computer readable medium storing thereon a control program enabling a computer to execute the step:

deploying a respective service code to at least one application server and storing in a memory device an identifier of said at least one application server that hosts said service code upon receiving a request for a new service; and decomposing said iFC into user specific parameters and user independent parameters.

2. The method of claim 1, wherein respective user specific parameters are provided for use in said iFC for execution of said user service by a respective user at a time of subscription to said service.

3. The method of claim 1, wherein said user independent parameters comprise global service data.

4. The method of claim 1, wherein said user independent parameters are provided to said iFC at a time of deployment of said service.

5. The method of claim 1, wherein said iFC only needs to be recorded in a storage device once for all users of said provider network having access to said storage device and desiring the execution of said service.

6. The method of claim 5, wherein a placeholder is recorded for each user specific parameter in said iFC until respective user specific parameters are provided to said iFC for execution of said service.

7. The method of claim 5, wherein said iFC is recorded in said storage device using Extensible Markup Language.

8. The method of claim 5, wherein said storage device comprises a Home Subscriber Server (HSS).

9. The method of claim 5, wherein said iFC is downloaded from said storage device and recorded in a Call Session Control Function (CSCF) server which delegates execution user services.

10. The method of claim 9, wherein said CSCF comprises a Serving CSCF.

11. The method of claim 9, wherein said iFC is recorded in said Serving CSCF using Extensible Markup Language.

12. The method of claim 1, wherein said iFC is a global service identifier.

13. The method of claim 1, wherein said iFC comprises a Trigger Point (TP) template.

14. A method for efficient storage of initial filter criteria (iFCs) associated with respective user services in a provider network, comprising a computer readable medium storing thereon a control program enabling a computer to execute the steps:

deploying a respective service code to at least one application server and storing in a memory device an identifier of said at least one application server that hosts said service code upon receiving a request for a new service; and decomposing said iFCs into user specific service parameters and user independent service parameters related to the execution of said respective user services such that each of said iFCs related to a respective user service only needs to be recorded in a storage device once for all users having access to said storage device and desiring the execution of said services, wherein a placeholder is stored for each of said user specific parameters and said user specific parameters are respectively provided to said iFCs for execution of said respective user services by a respective user at a time of execution of said services.

15. The method of claim 14, wherein said iFCs are stored in said storage device using Extensible Markup Language.

16. The method of claim 14, wherein said storage device comprises a Home Subscriber Server (HSS).

17. The method of claim 14, wherein said iFC comprises a Trigger Point (TP) template.

18. A method for deploying a new service in a provider network, comprising a computer readable medium storing thereon a control program enabling a computer to execute the steps:

deploying a respective service code to at least one application server and storing in a memory device an identifier of said at least one application server that hosts said service code upon receiving a request for a new service;

defining a Trigger Point (TP) template for said new service and storing said TP template in said memory device, said TP template comprising global service data and user specific service parameters; and assigning a default value and a description for each of said user specific service parameters in said TP template, said description indicating what user specific data is to be inserted into said TP template.

19. The method of claim 18, further comprising:
provisioning a Service Info field of said TP template.

20. The method of claim 19, wherein said provisioning comprises storing in said memory device a name for a Service Info character string.

21. The method of claim 19, wherein said provisioning comprises storing in said memory device a provisioning screen for said service.

22. The method of claim 18, further comprising determining and storing in said memory device a priority for said service.

23. The method of claim 18, further comprising determining a default handling for said service.

24. The method of claim 23, wherein said default handling comprises terminating a session if a critical service is not available.

25. The method of claim 23, wherein said default handling comprises continuing a session if a service is not available.

26. The method of claim 18, further comprising:
assigning at least one application server hosting said service as a host server and storing in a memory device, an identifier for said at least one application server upon receiving a user's subscription request for a service; and
provisioning said TP template with user specific actual parameters received in said subscription request.

27. An apparatus comprising a memory and a processor, said apparatus adapted to perform the steps of:

deploying a respective service code to at least one application server and storing in a memory device an identifier of said at least one application server that hosts said service code upon receiving a request for a new service; and defining a Trigger Point (TP) template for said new service and storing said TP template in said memory device, said TP template comprising global service data and user specific service parameters; and assigning a default value and a description for each of said user specific service parameters in said TP template, said description indicating what user specific data is to be inserted into said TP template.

28. The apparatus of claim 27, wherein said apparatus comprises a Serving Call Session Control Function (SCSCF) server.

29. The apparatus of claim 27, further adapted to perform the steps of:
upon receiving a user's subscription request for a service, assigning at least one application server hosting said service as a host server and storing in a memory device, an identifier for said at least one application server; and
provisioning said TP template with user specific actual parameters received in said subscription request.

* * * * *

UNITED STATES PATENT AND TRADEMARK OFFICE
CERTIFICATE OF CORRECTION

PATENT NO. : 7,643,626 B2
APPLICATION NO. : 11/022915
DATED : January 5, 2010
INVENTOR(S) : Haase et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1405 days.

Signed and Sealed this

Twenty-first Day of December, 2010

David J. Kappos
*Director of the United States Patent and Trademark Office*